United States Patent [19]

Albrecht

[11] Patent Number: 4,887,850
[45] Date of Patent: Dec. 19, 1989

[54] ADAPTER FITTING

[76] Inventor: David E. Albrecht, 1383 Granary Rd., Blue Bell, Pa. 19422

[21] Appl. No.: 349,652

[22] Filed: May 10, 1989

Related U.S. Application Data

[62] Division of Ser. No. 776,497, Sep. 16, 1985.

[51] Int. Cl.[4] ............................................. F16L 23/00
[52] U.S. Cl. .................................. 285/137.1; 285/368
[58] Field of Search ..................... 285/137.1, 368, 412, 285/212

[56] References Cited

U.S. PATENT DOCUMENTS

| | | | |
|---|---|---|---|
| 2,826,436 | 3/1958 | Hupp et al. | 285/368 X |
| 3,337,181 | 8/1967 | Wennerstrom | 285/137.1 X |
| 4,171,559 | 10/1979 | Uyse et al. | 285/137.1 X |
| 4,280,721 | 7/1981 | Narkon | 285/212 X |
| 4,426,103 | 1/1984 | Sundholm | 285/12 |
| 4,498,693 | 2/1985 | Schindele | 285/137.1 |

FOREIGN PATENT DOCUMENTS

| | | | |
|---|---|---|---|
| 1224164 | 6/1960 | France | 285/137.1 |
| 2311246 | 12/1976 | France | 285/137.1 |

Primary Examiner—Thomas F. Callaghan
Attorney, Agent, or Firm—Frank A. Follmer

[57] ABSTRACT

An adapter fitting made of two parts, a mounting member containing a fluid cavity and a flange member having bolt holes therein, is designed to enable fluid flow components of the type which can be bolted together and provide sealing at mating faces to be used with threaded connections and bolt-on flange connections.

2 Claims, 5 Drawing Sheets

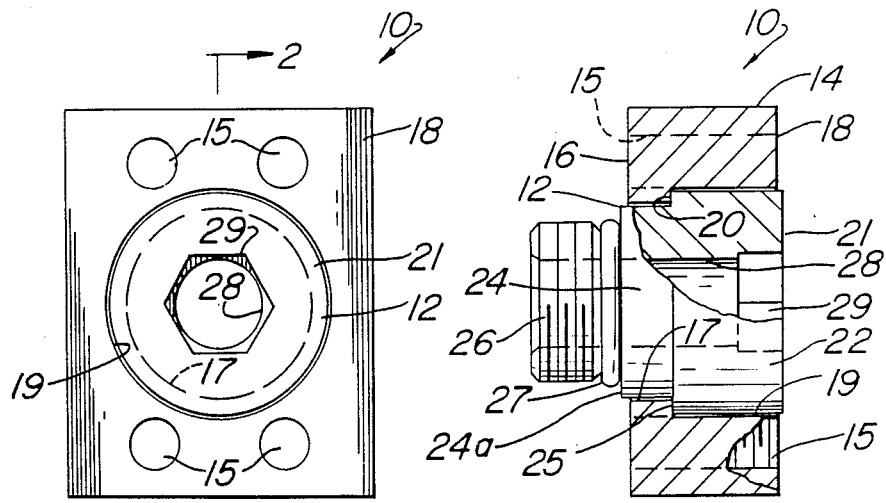
FIG. 1
FIG. 2
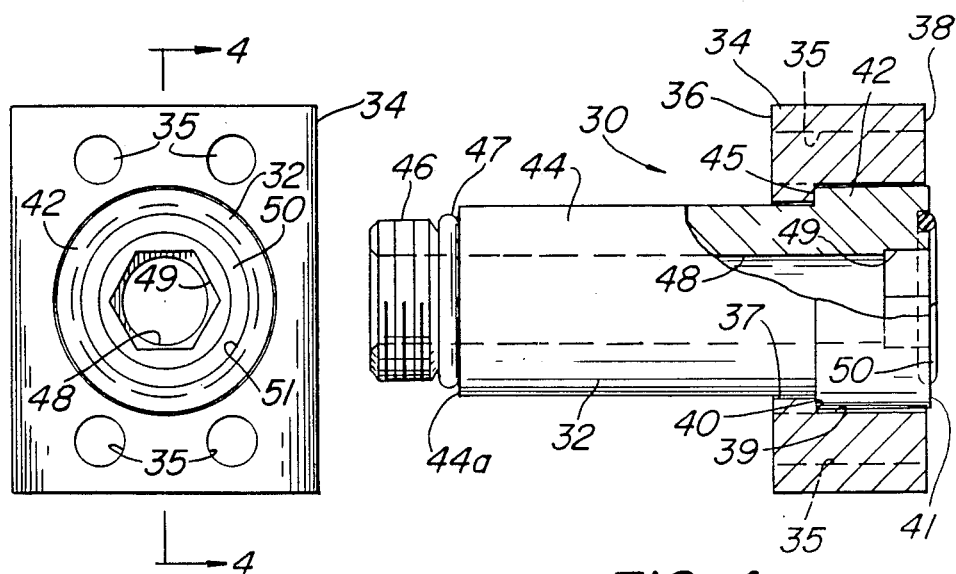
FIG. 3
FIG. 4

ADAPTER FITTING

This is a divisional of co-pending application Ser. No. 776,497 filed on Sept. 16, 1985.

BACKGROUND AND SUMMARY OF THE INVENTION

Fluid flow components of the type which can be bolted together and provide sealing at mating faces offer many advantages over conventional piping and control systems. These advantages include sealing integrity, a minimum number of joints, and compact overall dimensions. Other features and advantages of this type fluid flow component are described in my copending application Ser. No. 638,351, filed Aug. 6, 1984.

Fluid flow components of the indicated type can be used at any outlet that has a bolt-on flange configuration. However, it would be desirable to be able to adapt the fluid flow components of the indicated type for use with many types of outlets, in addition to the bolt-on flange configuration, since this would increase the number of applications that can benefit from the advantages thereof. In particular, it would be very desirable to be able to use these fluid flow components with positive sealing type thread connections such as the SAE straight-thread connections.

It is the general object of this invention to provide an adapter fitting which enables fluid flow components of the indicated type to be used with various types of outlets including the positive sealing threaded connections and bolt-on flange connections.

Briefly stated, the adapter fitting of the invention comprises two parts, a mounting member containing a fluid cavity and a flange member having bolt holes therein. The mounting member is positioned in the center of the bolt pattern of the flange member and is fastened to the positive seal type threaded connection of the outlet. A fluid flow component having a flange bolt pattern identical to that of the flange member of the adapter fitting may then be bolted to the flange member thereby drawing the adapter fitting and the component together by engagement with the flange member. The flange member is constrained from moving beyond the mounting member by a pair of mating shoulders, one on the flange member and the other on the mounting member. The face of the fluid flow component bolted to the adapter fitting will have a seal around the fluid cavity thereof, the sealing being accomplished as the seal meets the face of the mounting member of the adapter fitting. The flange member is used in the fastening but does not participate in any sealing action since the fluid cavity is enclosed entirely within the mounting member. The mounting member is provided with a wrenching surface to aid in fastening it to the previous threaded fluid flow component. Various modifications of the adapter fitting of the invention are possible as is described more fully in the following specification.

BRIEF DESCRIPTION OF THE DRAWINGS

FIG. 1 is a front elevation of an adapter fitting in accordance with the invention.

FIG. 2 is a sectional view taken on line 2—2 of FIG. 1.

FIG. 3 is a front elevational view of a modified type of adapter fitting in accordance with the invention.

FIG. 4 is a sectional view taken generally on line 4—4 of FIG. 3.

DETAILED DESCRIPTION OF THE PREFERRED EMBODIMENTS

Figure 5:
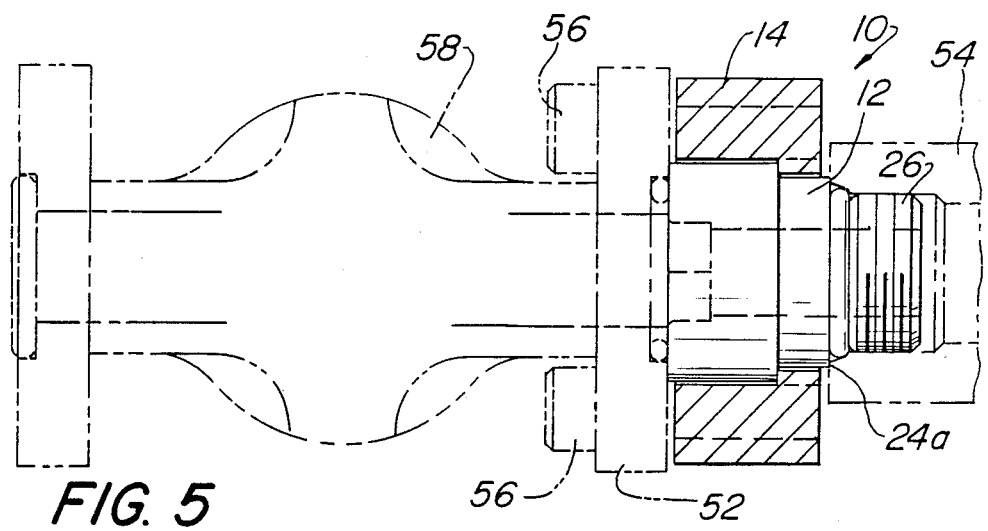
FIG. 5 is a view illustrating the use of the adapter fitting of the invention in providing for the transition from a threaded connection to a component having a flange connection.

Referring to FIGS. 1 and 2, the adapter fitting 10 of the invention shown therein comprises two parts, namely, a mounting member 12 and a flange member 14. Flange member 14 is provided with four threaded bolt holes 15 arranged in a bolt pattern comprising a rectangular configuration as is best shown in FIG. 1. Flange member 14 has a cylindrical bore extending between the spaced apart, parallel faces 16 and 18 thereof and located in the center of the bolt pattern. This central bore comprises a bore portion 17 extending inwardly from face 16 and a bore portion 19 extending inwardly from face 18. Bore portion 19 has a larger diameter than bore portion 17 whereby they meet at an annular shoulder 20. Mounting member 12 has a cylindrical shape and is positioned in the central bore portions 17 and 19 in the center of the bolt pattern of flange member 14 and is adapted to be fastened to the threaded connection of a compatible outlet such as a flow component having a threaded outlet. Mounting member 12 has an enlarged diameter portion 22 received in the large bore portion 19 of flange member 14, a reduced diameter portion 24 received in the smaller bore portion 17 of flange member 14, and an annular shoulder 25 as is shown in FIG. 2. By this construction, annular shoulder 25 of mounting member 12 is arranged to mate with the annular shoulder 20 of flange member 14 so as to limit relative movement therebetween in one direction for holding the parts in the position as shown in FIG. 2. The reduced diameter portion 24 of mounting member 12 extends outwardly from the face 16 of flange member 14 and terminates at an externally threaded end portion 26. An O-ring seal 27 extends around the circumference of the threaded end portion 26 at the inward end thereof, as shown in FIG. 2, to provide sealing contact with the internal wall portion of the threaded outlet to which this portion is to be engaged, such as a standard (SAE) straight thread port. A radially extending annular wall 24a is formed on mounting member portion 24 adjacent O-ring seal 27. When adapter fitting 10 is connected to a positive seal straight thread arrangement, such as the SAE straight thread (See FIGS. 5 and 8) and others, wall 24a provides a shoulder which is used as a positive stop for the thread, which permits prestressing of the thread, and which allows the shoulder surface to be held under compression to maintain a positive retaining surface between the shoulder surface and the mating component. This permits sealing ring 27 to be extremely effective as a positive seal. Referring to FIG. 5, the SAE straight thread port of component 54 provides a threaded flow connector engaged on threaded portion 26 and bottomed out on the shoulder provided by wall 24a.

Mounting member 12 is provided with a central axially extending bore 28 providing a fluid flow passage which extends completely through the mounting member 12 from the threaded end 26 to the annular face 21 thereof which extends slightly beyond the face 18 of flange member 14 when shoulders 20 and 25 mate as is apparent from a consideration of FIG. 2. It is important that face 21 extend slightly beyond face 18 so as not to interfere with the sealing means that cooperate with face 21.

Mounting member 12 is provided with a wrenching surface 29 to aid in fastening the mounting member 12 to the threaded outlet. As shown in FIGS. 1 and 2, wrenching surface 29 comprises an internally broached hexagonal configuration. However, it will be apparent that other types of wrenching surfaces may be employed, such as spanner holes or the like. By providing the wrenching surface 29 internally of the mounting member 12 and extending it inwardly from the face 21 thereof, the design allows for a mounting that is of a minimum length.

It will be noted that the face of the component bolted to the flange member 14 of adapter fitting 10 will have a seal extending around the fluid passage bore 28. This sealing is accomplished as the seal meets the face 21 of the mounting member 12 in an area extending around the opening of fluid passage bore 28 therein. It will be noted that the flange member 14 participates in the fastening of adapter fitting 10 to the fluid components, but is not involved in any sealing action, the fluid passage bore 28 being entirely enclosed within the mounting member 12.

FIGS. 3 and 4 disclose a modified adapter fitting 30 in accordance with the invention. Adapter fitting 30 is essentially the same as adapter fitting 10 except that the extending body portion of the mounting member is longer, a face-mounted seal is provided on the mounting member and the flange member is provided with through (non-threaded) bolt holes.

Figure 7:
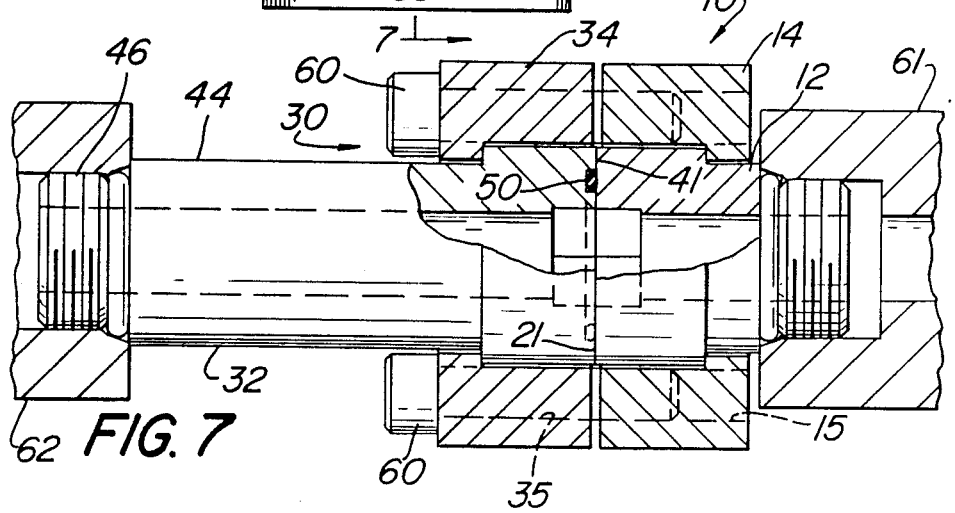
FIG. 7 is a sectional view taken generally on line 7—7 of FIG. 6.
Figure 9:
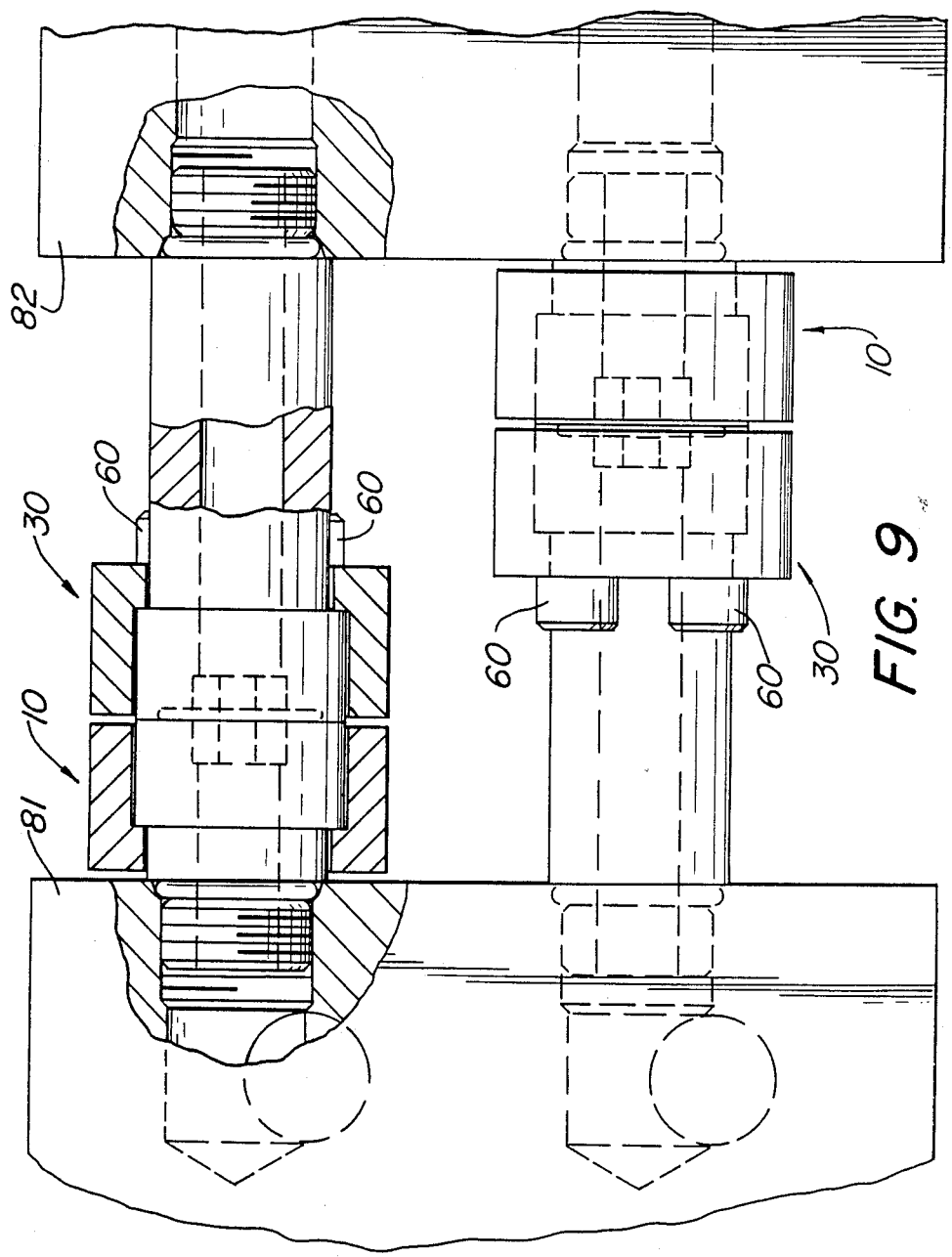
FIG. 9 is an elevational view, partly in section, showing the use of adapter fittings of the invention to link two components in more than one place.

Adapter fitting 30 comprises two parts, namely, a mounting member 32 and a flange member 34. Flange member 34 is provided with four through bolt holes 35 arranged in a bolt pattern comprising a rectangular configuration as is best shown in FIG. 3. Flange member 34 has a cylindrical bore extending between the spaced apart, parallel faces 36 and 38 thereof and located in the center of the bolt pattern. This central bore comprises a small diameter bore portion 37 extending inwardly from face 36 and a large diameter bore portion 39 extending inwardly from face 38 to meet at an annular shoulder 40. Mounting member 32 has a cylindrical shape and is positioned in the central bore portions 37 and 39 in the center of the bolt pattern of flange member 34 and is adapted to be fastened to the threaded connection of a positive sealing type thread connection such as the SAE straight thread connection. Mounting member 32 has an enlarged diameter portion 42 received in the large bore portion 39 of flange member 34, a reduced diameter portion 44 received in the smaller bore portion 37 of flange member 34, and an annular shoulder 45 as is shown in FIG. 4. By this construction, annular shoulder 45 of mounting member 32 is arranged to mate with the annular shoulder 40 of flange member 34 so as to limit relative movement therebetween in one direction for positioning the parts as shown in FIG. 4. The reduced diameter portion 44 of mounting member 32 extends outwardly from the face 36 of flange member 34 a substantial distance and terminates at an externally threaded end portion 46 at a location spaced substantially from face 36. An O-ring seal 47 extends around the circumference of the threaded end portion 46, as shown in FIG. 2, to provide sealing contact with the internal wall portion of the theaded outlet to which this portion is to be engaged, such as a standard (SAE) straight thread port. A radially extending annular wall as wall 24a as described above when adapter fitting 30 is connected to a positive seal straight thread arrangement, such as is shown in FIGS. 7 and 9.

Mounting member 32 is provided with a central axially extending bore 48 providing a fluid flow passage which extends completely through the mounting member 12 from the threaded end 46 to the annular face 41 thereof which is approximately aligned with the face 38 of flange member 34 when shoulders 40 and 45 mate as is apparent from a consideration of FIG. 4. Face 41 must extend slightly beyond face 38.

Mounting member 32 is provided with a wrenching surface 49 to aid in fastening the mounting member 32 to the threaded outlet. As shown in FIGS. 3 and 4, wrenching surface 49 comprises an internally broached hexagonal configuration. However, it will be apparent that other types of wrenching surfaces may be employed, such as spanner holes or the like. By providing the wrenching surface 49 internally of the mounting member 32 and extending it inwardly from the face 41 thereof, the design allows for a mounting that is of a minimum length.

An O-ring sealing member 50 is mounted in an annular recess 51 in the face 41 of mounting member 32 and is constructed to project slightly from this face so as to provide good sealing contact with a fluid flow component mounted in face-to-face contact adjacent thereto. The wrenching portion 49 is located within the annular recess 51 as is apparent from FIG. 3.

Adapter fitting 30 is constructed so as to accomplish the transformation from a flange connection to a threaded connection of the type described above in an application where extra clearance between the flange and the threaded component may be needed for the insertion of bolts and wrenching means. It will be apparent, however, that adapter fitting 30 may be constructed with the same dimensions as adapter fitting 10 if there are no limiting geometries in the particular application where the adapter fitting 30 is to be used.

FIG. 5 illustrates the use of an adapter fitting 10 to convert from a threaded connection of the type described to a flange connection. As shown in this Figure, the adapter fitting 10 is connected to an SAE straight thread port of component 54 with the threaded end 26 of its mounting member 12 in engagement with the threaded internal wall of component 54, the end of which is bottomed out on the shoulder provided by wall 24a. Flange member 14 of adapter fitting 10 is connected to the flange of a typical SAE four bolt flange 52 on fluid flow component 58 by means of bolts 56.

An example of the use of the arrangement shown in FIG. 5 is an application where it is desired to put one or more flange mounted components in line with a manifold that has threaded connections. Using prior art connectors this would be accomplished using tubing and associated fittings. More specifically, a fitting would be used for the transition from a threaded connection to the tubing and the tubing would then run to another fitting that is fastened to the flange. This same transition that, with the prior art, requires four joints and a lengthy assembly time can be accomplished by simply fastening the adapter fitting 10 of the invention to the threaded connection whereby only one connection and very little assembly time is used. Moreover, a very compact connection is used.

Many high pressure pumps are furnished with SAE flange patterns at the outlet. Sometimes it is desired to have SAE threaded type components in direct fluid communication with the pump, such as, for example, in the case of a high pressure filter. With filters, a threaded connection is often less expensive than its flange counterpart. Much of the same prior art tubing transition as described immediately above would normally be used. However, by using an adapter fitting 30 of the invention there is offered a much better alternative with respect to ease of installation and compactness.

Figure 6:
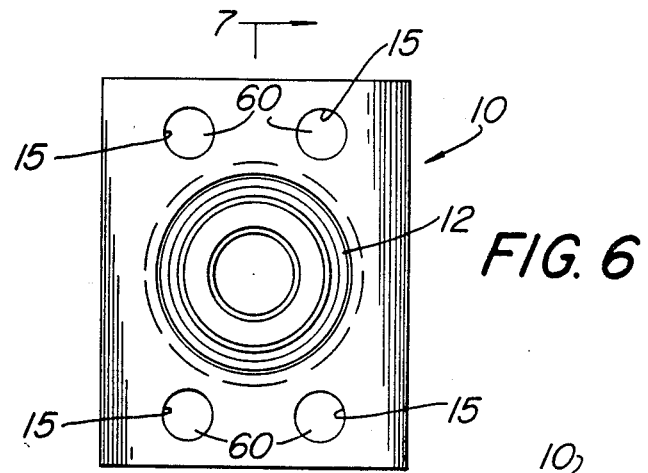
FIG. 6 is a front elevational view of a union to connect two threaded components by means of two adapter fittings in accordance with the invention.

FIGS. 6 and 7 show the manner in which adapter fittings 10 and 30 of the invention can be used to form a union adapted to connect two threaded components 61 and 62. The threaded outlet connection of component 61 is furnished with an adapter fitting 10 while the threaded outlet connection of component 62 is furnished with adapter fitting 30. Bolts 60 passing through the non-threaded holes 35 of adapter fitting 30 and engaging the threaded holes 15 of adapter fitting 10 draw and hold the two flange members 14 and 34 together, and, thus, the two threaded components 61 and 62 are held together as is apparent from a consideration of FIG. 7. Sealing between the two opposing faces 21 and 41 is accomplished with a seal 50 provided in the face 41 of adapter fitting 30. The extended mounting member portion 44 of adapter fitting 30 provides room to insert the bolts 60 and to engage them with a wrench in the event that the geometries of the threaded components being joined should be restrictive.

Figure 8:
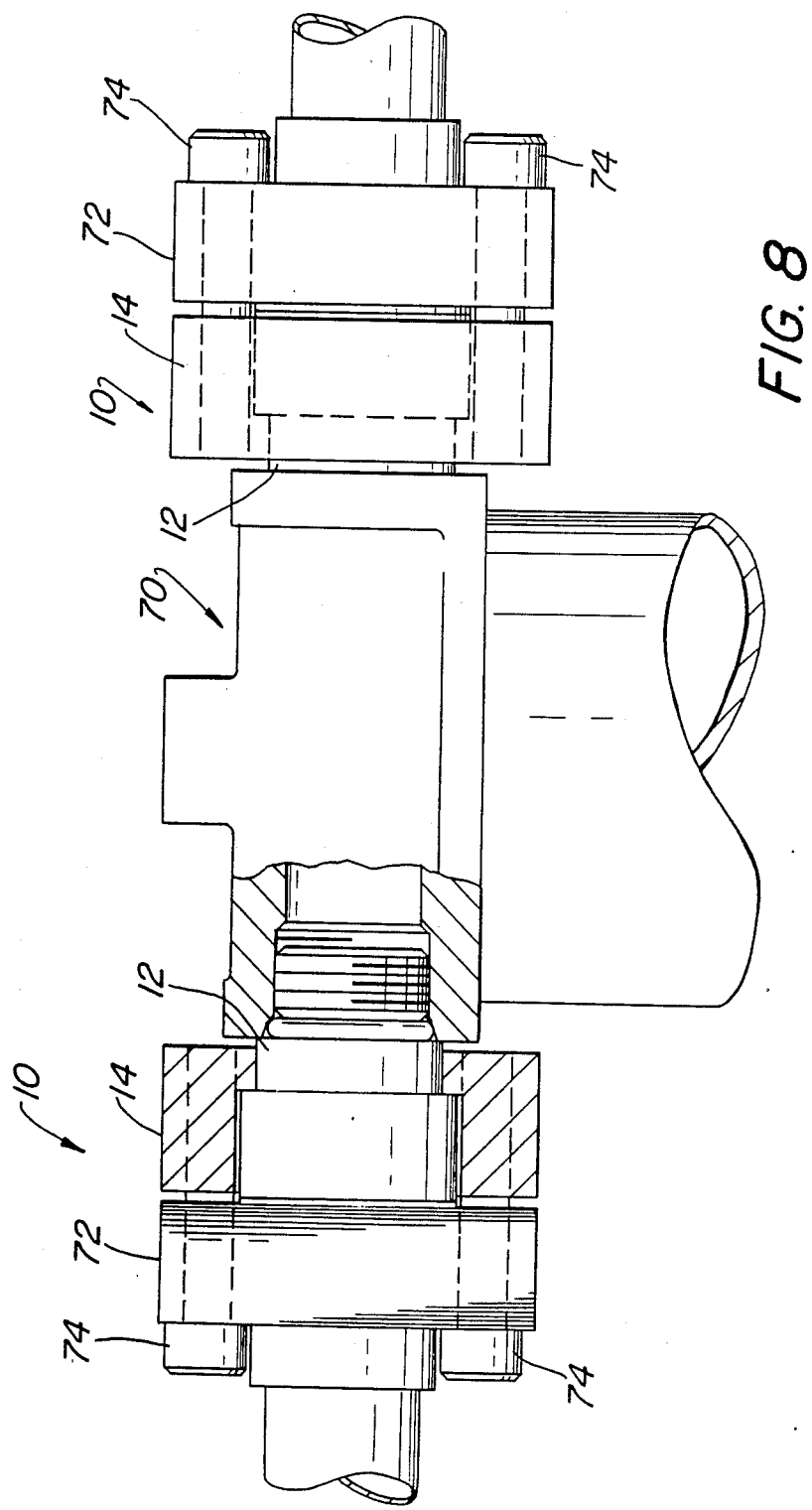
FIG. 8 is an elevational view illustrating the use of the adapter fittings of the invention to mount a component which can provide for easy removal of the component.

FIG. 8 shows the manner in which a pair of adapter fittings 10 can be used to provide easy removal of a fluid flow component such as a filter 70. More specifically, filter 70, which has a standard SAE O-ring boss connection, is engaged with the mounting members 12 of a pair of adapter fittings 10, as is shown in FIG. 8. Each of the flange members 14 of the two adapter fittings 10 is coupled to a standard SAE four bolt flange 72 by flange bolts 74 to provide the arrangement shown in FIG. 8. By this arrangement, the filter 70 can be removed and changed by simply removing the flange bolts 74 while leaving everything (such as the downstream piping) on both sides undisturbed. This will permit the filter 70 to be removed along with its connected adapter fittings 10 and allow a new or renewed filter to be reinstalled as desired.

FIG. 9 illustrates the manner in which the adapter fittings of the invention can be used to link two components, such as manifolds, in more than one place. This is achieved by using two matched sets of unions of adapter fittings 10 and 30 as shown in FIG. 6 and connecting them at their outer threaded connections to the threaded outlets of the two manifolds 81 and 82 as shown in FIG. 9. The sets are "matched" in the sense that distances between the surfaces that come into contact with the manifold surfaces are made to be substantially identical. Preferably the two unions are oriented in a staggered relation as shown in FIG. 9.

Figure 11:
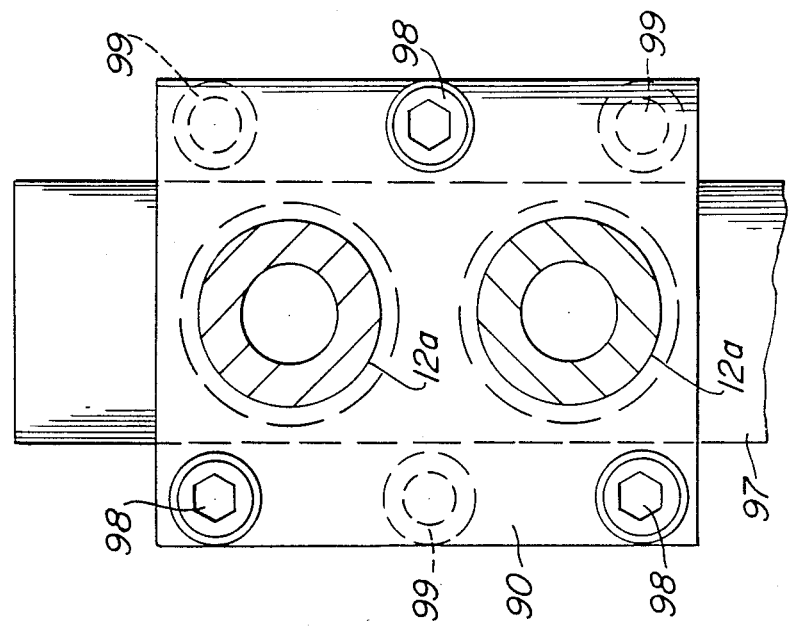
FIG. 11 is a sectional view taken on line 11—11 of FIG. 10.
Figure 10:
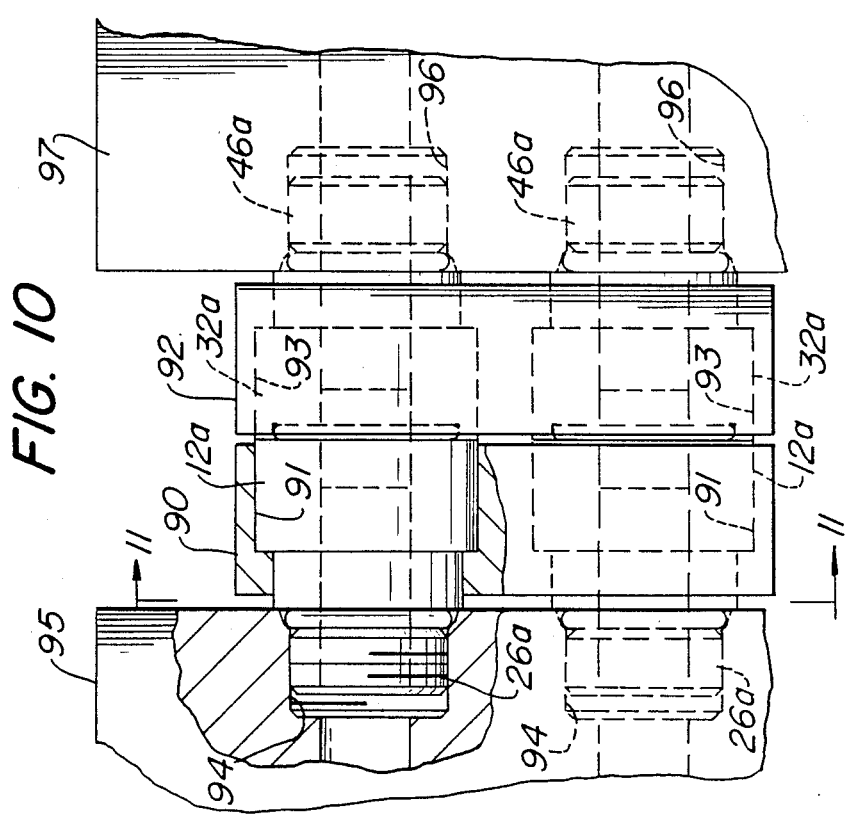
FIG. 10 is an elevational view of another embodiment of the invention.

In FIGS. 10 and 11 there is shown another arrangement for joining two manifolds using two matched sets of adapters. This arrangement is much more compact than that shown in FIG. 9 and is best employed with thinner manifolds whereby the connections between the flange members can be made to the side of the manifolds. This arrangement can also be employed where there is room within the manifolds to machine grooves to permit the connecting bolts to be assembled and disassembled.

The arrangement shown in FIGS. 10 and 11 comprises a pair of splice plates 90 and 92 each having two spaced apart bores for containing mounting members 12a and 32a, respectively, as is best shown in FIG. 10. Mounting members 12a are constructed the same as mounting member 12 and cooperate with the stepped bores 91 in splice plate 90 in the same manner as mounting member 12 cooperates with bores 17 and 19 and shoulder 20 of flange member 14. Mounting members 32a are constructed essentially the same as mounting member 32 except that their reduced diameter portion is the same length as that of mounting members 12a, as is shown in FIG. 10. Mounting members 32a cooperate with the stepped bores 93 in splice plate 92 in the same manner as mounting member 32 cooperates with bores 37 and 39 and shoulder 40 of flange member 34. The threaded outlet connections 94 of a manifold 95 are engaged by the threaded ends 26a of mounting members 12a, and the threaded outlet connections 96 of a manifold 97 are engaged by the threaded ends 46a of mounting members 32a, the manifold faces being bottomed out on the end shoulders of the mounting members as shown in FIG. 10. To this end, bores 91 and 93 are axially aligned with each other and with outlet connections 94 and 96 as shown in FIG. 10.

The splice plates 90 and 92 are drawn together and held in the position shown in the drawings by six bolts, three bolts 98 passing through holes in splice plate 90 to engage threaded holes in splice plate 92 and three bolts 99 passing through holes in splice plate 92 to engage threaded holes in splice plate 90, the heads of bolts 98 and 99 being received in recesses in splice plates 90 and 92, respectively. By this arrangement manifolds 95 and 97 are held together and maintained a precise distance apart.

The arrangement of FIGS. 10 and 11 uses two matched sets of the mounting members 12a and 32a as in the arrangement of FIG. 9. This ensures that the distance between the manifolds 95 and 97 at both outlet locations are maintained and held and that there is provided perfectly flush mating surfaces at the two mounting surfaces. The geometry of the adapter fittings of the invention is such that this can be accomplished economically, such as by lapping the two associated mounting members as matched pairs.

The adapter fitting of the invention requires several basic dimensional relationships.

As to the mounting member 32, the points of the internally broached hexagonal shaped wrenching portion 49 should fall within the inner diameter of the seal 50 and the outside diameter of the sealing face 41 of the mounting member 42 must be greater than the outer diameter of the seal 50.

Regarding the flange member, the bolt pattern can be dictated by a standard (SAE) or it can be fashioned in any pattern desired. The thickness of the flange member is based primarily on either the minimum thread engagement or that thickness needed to limit bending to an acceptable value, which ever is greater. The minimum thread engagement is calculated from the anticipated loading on each bolt, with allowance for adequate thread engagement to withstand anticipated loads developed during preloading and component operation without permanent deformation.

Also, the shoulder depth must be sufficient to resist deformation due to a bending moment as well as to resist permanent deformation in shear. This applies to the shoulder depth for both the flange member and the mounting member. If it is determined that the sum of the shoulder depth for the flange member and the mounting member exceeds the minimum thread engagement, the flange width will have to be increased appropriately. Similarly, if this sum is less than the minimum thread engagement, the mounting member or flange member shoulder depth will be increased accordingly.

Another important dimensional relationship, which was discussed above, is that the face of the flange member is recessed relative to the O-ring seal face of the mounting member. If the sealing face of the mounting member is recessed beneath the face of the flange member, sealing will be inadequate. Therefore, the distance from the shoulder of the mounting member to the sealing face should be slightly greater than that of the flange member.

Furthermore, the overall length of the mounting member must be sufficient to allow proper engagement of the SAE threaded type connection without interference from the flange member. This will vary for different types of threaded connectors.

What is claimed is:

1. An adapter fitting arrangement for connecting two manifolds or the like in flow communication at a plurality of locations having threaded outlet connections comprising:

a first splice plate having a plurality of bolt holes arranged in a pattern and two spaced apart bores extending therethrough and located within said bolt hole pattern, a second splice plate having a plurality of bolt holes arranged in a pattern and two spaced apart bores extending through and located within said bolt hole pattern, said bolt holes and said bores in said first and second splice plates being arranged in similar patterns so as to be axially aligned, a pair of first mounting members each of which is mounted in one of said bores of said first splice plate, each of said first mounting members including a first body portion held in said first splice plate bore, a second body portion extending beyond said first splice plate to a location spaced therefrom, said extended end of said second body portion having threads formed thereon for engagement with a threaded flow connection of one of the manifolds, and a fluid flow passage extending through said body portions, and a pair of second mounting members each of which is mounted in one of said bores of said second splice plate, each of said second mounting members including a first body portion held in said second splice plate bore, a second body portion extending beyond said second splice plate to a location spaced therefrom, said extended end of said second body portion having threads formed thereon for engagement with a threaded outlet connection of the other of said manifolds, and a fluid flow passage extending through said body portions, bolt means cooperable with said bolt holes in said first and second splice plates for engaging the same to draw said splice plates together to bring said first body portions of said first and second mounting members together in mating face-to-face contact with said fluid flow passages thereof in flow communication.

2. An adapter fitting arrangement according to claim 1 including means providing sealing contact between said mating first body portions of said first and second mounting members.

* * * * *